United States Patent [19]

Craun

[11] Patent Number: 4,487,889

[45] Date of Patent: Dec. 11, 1984

[54] AQUEOUS GLYCOLURIL THERMOSETTING COATING

[75] Inventor: Gary P. Craun, Wickliffe, Ohio

[73] Assignee: SCM Corporation, New York, N.Y.

[21] Appl. No.: 603,693

[22] Filed: Apr. 25, 1984

[51] Int. Cl.³ .............................................. C08L 61/24
[52] U.S. Cl. .................................... 525/163; 524/388; 524/512; 525/157; 525/162
[58] Field of Search ....................... 524/512, 387, 388; 525/162, 163, 157, 329.4

[56] References Cited

U.S. PATENT DOCUMENTS

| | | | |
|---|---|---|---|
| 3,736,284 | 5/1973 | Fitko | 524/512 |
| 4,064,191 | 12/1977 | Parekh | 525/186 |
| 4,254,235 | 3/1981 | Turpin | 525/162 |

*Primary Examiner*—Theodore E. Pertilla
*Attorney, Agent, or Firm*—Thomas M. Schmitz

[57] ABSTRACT

A protective surface coating composition containing polyol, glycoluril, and emulsion polymer can be heat cured to produce cured films on substrates. The coating is particularly useful as wood coatings.

6 Claims, No Drawings

AQUEOUS GLYCOLURIL THERMOSETTING COATING

BACKGROUND OF THE INVENTION

This invention relates to thermosetting emulsion latex mixtures and more particularly to an aqueous polymeric mixture containing polyol, an emulsion polymer, and a glycoluril adapted to be coreactive with the reactive emulsion polymer upon moderate heating. The thermosetting compositions are useful as wood coatings.

Glycoluril compositions are known for use in solvent based coatings such as disclosed in U.S. Pat. No. 4,064,191. Powder coatings based on glycoluril are disclosed in U.S. Pat. No. 4,118,432, U.S. Pat. No. 4,254,235 and U.S. Pat. No. 4,255,558. Low temperature cure aqueous dispersed coatings are disclosed in U.S. Pat. No. 4,442,257.

It now has been found that aqueous coatings based on glycoluril and emulsion polymers can be substantially improved by the inclusion of a polyol having a hydroxyl functionality of two and preferably three or more hydroxyl groups. The inclusion of polyol substantially improves stability of the aqueous dispersed glycoluril polymers and reactive emulsion polymers. Glycoluril-formaldehyde coatings can be formulated in accordance with this invention to provide highly crosslinked binders and coatings exhibiting excellent film properties. Emulsion polymers preferably containing reactive acrylamide, hydroxyl, or carboxyl groups can be blended with polyols and glycolurils such as methylolated glycolurils to produce high quality coatings which advantageously overcome excess formaldehyde emission problems typically associated with conventional phenol-formaldehyde or ureaformaldehyde systems. A further advantage of the inclusion of polyol in the thermosetting glycoluril and emulsion polymer mixtures is that the quantity of glycoluril can be substantially reduced while still maintaining equivalent or improved film properties. Lower raw material costs at lower crosslinker levels can be obtained in coating compositions prepared at higher solids content while substantially improving the stability of the aqueous dispersed polymeric mixture. A further advantage is achieved with respect to coalescent aids, which can impart water sensitivity to the coating, are no longer required. The coating compositions of this invention will cure as thermoset coatings on a substrate at low temperatures of about 40° C. to 120° C. at time intervals between 0.1 to 20 minutes and advantageously in less than three minutes. These and other advantages of the invention will become more apparent by referring to the detailed description and the illustrative examples.

SUMMARY OF THE INVENTION

Briefly, the composition of this invention comprises by weight between about 2% and 60% polyol, between 2% and 60% glycoluril, and between 10% and 80% emulsion polymer. The emulsion polymer comprises copolymerized ethylenically unsaturated monomers and preferably contains copolymerized carboxyl, acrylamide or methacrylamide monomers. The emulsion polymer, polyol, and glycoluril preferably are blended together under moderate heat.

DETAILED DESCRIPTION OF THE INVENTION

The aqueous thermosetting polymeric mixture of this invention comprises polyol, emulsion matrix polymer, and glycoluril.

Referring first to the polyol, suitable polyols include diols, triols, and higher polyol containing at least two hydroxyl groups. Preferred polyols comprise chemicals containing three or more hydroxyl groups. Particularly desirable polyols include for example pentaerythritol, dipentaerythritol, trimethylol propane, trimethylol ethane, sorbitol, glycerol, and neopentyl glycol. The higher polyols containing three or more hydroxyl groups seem to impart better solvent resistance to the coating film. Acceptable diols or glycols include for instance, propylene glycol, ethylene glycol, butyl glycols, dipropylene glycol, diethylene glycols and similar alkyl glycols.

Referring next to the emulsion matrix polymer, said emulsion polymer contains polymerized ethylenically unsaturated monomers. Preferred compositions comprise on a weight basis between 0% and 20% carboxylic monomer, 0% and 20% alkylhydroxy monomer, and the balance being other ethylenically unsaturated monomers. The preferred emulsion polymer contains copolymerized functional monomers comprising copolymerized ethylenically unsaturated monomers including at least 10% copolymerized monomers of acrylamide, N-methylol acrylamide, carboxyl monomer, or hydroxyl monomer. The most preferred emulsion latex matrix polymer can contain by weight between 1% and 20% acrylamide or methacrylamide and between 0.5% to 10% carboxylic acid monomer, and from 0% to 20% alkylhydroxy monomer. The remaining monomers can be other ethylenically unsaturated monomer. The acrylamide monomers can be acrylamide, methacrylamide, ethylacrylamide, acrylonitrile, methacrylonitrile, and similar alkyl acrylamide and methacrylamide monomers. N-alkanol amide monomers include for example, N-methylol acrylamide, N-ethanol acrylamide, N-propanol acrylamide, N-methylol methacrylamide, N-ethanol methacrylamide, and similar acrylamides and methacrylamide. Carboxy containing monomers are ethylenically unsaturated monomers containing carboxyl groups such as acrylic, methacrylic, or ethacrylic acid, as well as itaconic, citriconic, fumaric, maleic, mesaconic and aconitic acids. The preferred acids are acrylic and methacrylic acids. Hydroxyl containing monomers are ethylenically unsaturated monomers containing a hydroxyl and can include for example hydroxy alkyl acrylates or methacrylates such as hydroxyethyl, hydroxypropyl, hydroxybutyl, hydroxyhexyl, hydroxyoctyl and similar lower alkyl hydroxy acrylates and methacrylates. Other ethylenically unsaturated monomers other than acrylamide, carboxy, and hydroxyl monomers can include vinyl unsaturated monomers containing vinyl double bond unsaturation including, for example, vinyl esters such as vinyl acetate, vinyl propionate, vinyl butyrates, vinyl benzoate, isopropenyl acetate and like vinyl esters; and vinyl halides such as vinyl chloride. Ethylenically unsaturated monomers other than vinyl unsaturated monomers can include, for example, styrene, methyl stryrenes and similar alkyl styrenes, chlorostyrene, vinyl toluene, vinyl naphthalene, divinyl benzene, diallyl phthalate and similar diallyl derivatives, butadiene, alkyl esters of acrylic and methacrylic acid and similar ethylenically unsaturated monomers. Acrylic unsaturated monomers include lower alkyl esters of acrylic or methacrylic acid having an alkyl ester portion containing between 1 to 12 carbon atoms as well as aromatic derivatives of acrylic and methacrylic acid, and can include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids. The ethylenically unsaturated monomers can be copolymerized by free radical induced addition polymerization using peroxy or azo catalysts, common redox catalysts, ultraviolet radiation, or the like.

The ethylenic monomers can be polymerized in an aqueous medium at a pH preferably between about 1.0 and 6. Generally, the polymerization is conducted at a temperature of about 20°-100° C. in the presence of a free radical generating catalyst. Commonly used free radical initiators include various peroxygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide; azo compounds such as azodiisobutyronitrile and dimethylazodiisobutyrate; and the like. Particularly preferred as polymerization initiators are the water-soluble peroxygen compounds such as hydrogen peroxide and the sodium, potassium and ammonium persulfates used by themselves or in activated "redox" type systems. Typical "redox" systems include alkali metal persulfates with: A reducing substance such as a polyhydroxy phenol and oxidizable sulfur compound such as sodium sulfite or sodium bisulfite, a reducing sugar, dimethylamino propionitrile, a diazomercapto compound and a ferricyanide compound, and the like. The amount of intiator used will generally be in the range between about 0.1 to 3% by weight based on the monomers and preferably is maintained between 0.15 and 0.8% by weight. Usually the initiator will all be charged at the outset of the polymerization, however, incremental addition or proportioning of the initiator is often employed.

When an emulsifier is used to prepare the lactices of this invention, they are the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate; ethanolamine lauryl sulfate, ethylamide lauryl sulfate; alkali metal and ammonium salts of sulfonated petroleum or paraffin oils; sodium salts of aromatic sulfonic acids, such as dodecane-1-sulfonic acid and octadiene-1-sulfonic acid; aralkylsulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium N-octadecylsulfosuccinanate; alkali metal or ammonium salts of free acids of complex organic mono- and diphosphate esters and the like. So-called non-ionic emulsifiers such as octyl- or nonylphenyl polyethoxyethanol and the like can be used.

The amount of emulsifier used may be from about 0.01 to 6% or more by weight of the monomers. All the emulsifier may be added at the beginning of the polymerization or it may be added incrementally or by proportioning throughout the run. Typical polymerizations for the preparation of the self-emulsion latices of this invention are conducted by charging the monomers into the polymerization reactor which contains water and a portion of the emulsifying agent. The reactor and its contents are heated and the initiator added. The preferred emulsion latex matrix polymer can contain by weight between 1% and 20% acrylamide or methacrylamide, 0.5% to 10% carboxylic acid monomer, and from 0% to 20% alkylhydroxy monomer with the balance being other ethylenically unsaturated monomers.

The reactive polymer containing reactive hydroxyl, carboxyl, or acrylamide groups is adapted to be crosslinked by reaction with a glycoluril derivative. Glycoluril derivatives are disclosed in U.S. Pat. No. 4,064,191 and are also known as acetylendiureas. Glycolurils are derived by reacting two moles of urea with one mole of glyoxal to provide a complex ring structure illustrated as follows:

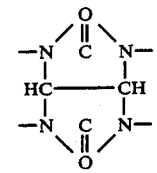

The substitutes constituents can be a hydrogen, or a lower alkyl radical, or can be methylolated partially or fully by reacting with 1 to 4 moles of formaldehyde to provide a methylol glycoluril. The preparation of various glycolurils is illustrated in U.S. Pat. No. 4,064,191 such as tetramethylol glycoluril, tetrabutoxymethyl glycoluril, partially methyolated glycoluril, tetramethoxymethyl glycoluril, and dimethyoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakisopropoxymethyl glycoluril, tetrakisbutoxymethyl glycoluril, tetrakisamyloxymethyl glycoluril, tetrakishexoxymethyl glycoluril and the like. A further suitable glycol derivative comprises a dihydroxy ethylene urea which is believed to have the following chemical structure:

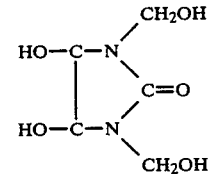

The thermosetting composition of this invention can comprise by weight between 2% and 60% polyol, between 2% and 60% glycoluril, and between 10% and 80% reactive matrix polymer. Preferred compositions comprise 10% to 30% polyol, 10% to 30% glycoluril, and 30% to 60% reactive matrix polymer.

The polyol, glycoluril, and emulsion polymer can be blended together at ambient temperatures but preferably are blended under moderate heat above 50° C. and preferably between 50° C. and 100° C. and most preferably between 60° C. and 80° C. for time sufficient to obtain a uniform mixture and typically less than two hours. Preferentially improved film properties can be obtained by blending under heat. The polyols can be added directly to the emulsion polymer or to the glycoluril.

The merits of this invention are further illustrated by the following examples.

EXAMPLE 1

(a) Latex. An emulsion polymer was produced from the following components:

| | | |
|---|---|---|
| deionized water | 95 | grams |
| sodium dihexyl sulfosuccinate | .27 | grams |
| ammonium persulfate | .53 | grams |
| sodium bis-tridecyl suffosuccinate | 0.319 | grams |
| styrene | 56.2 | grams |
| ethyl acrylate | 35.4 | grams |
| acrylamide | 4.2 | grams |
| glacial methacrylic acid | 4.0 | grams |
| sodium formaldehyde sulfoxilate | 0.180 | grams |
| tertiary butyl hydroperoxide | 0.012 | grams |

The emulsion polymer is prepared as follows. The monomers are polymerized in a conventional reactor using a standard procedure of metering in the main body of monomer into the heated water plus surfactant over a 2-5 hour intervals. Batch loading of monomer is possible but not preferred. Changing the monomer composition during the feed is also possible and may lead to faster cure and/or cleaner batches. The reaction is run at 60°-86° C. The sodium formaldehyde sulfoxilate and t-butyl hydroperoxide are added after the main body of monomers have been polymerized in order that traces of free monomer are reacted. The emulsion polymer latex is particularly suitable as a binder system for a paint composition.

(b) Clear Coating Composition. The foregoing latex (a) can be utilized to produce a useful clear coating composition which can be applied to a substrate and cured at low temperatures such as 1 minute at 200° F., or an oven bake and/or infrared heat to achieve a substrate surface temperature of from about 100° F. to about 260° F. A typical clear coating composition is as follows.

| CLEAR COATING COMPOSITION | |
|---|---|
| tetramethylol glycoluril | 720 grams |
| trimethylol propane | 480 grams |
| Water | 997 grams |
| Latex | 2440 grams |

Glycoluril and polyol were added to the latex which was being stirred at 80° C. The mixture was cooled after 1 hour of mixing. Defoamers, waxes, and slip aids can be added as desired. About 5% by weight p-toluene sulfonic acid was added prior to use and the film was cured for 1 minute at 180° F. to provide an excellent cured film.

EXAMPLE 2

Similar to Example 1, an emulsion polymer was produced from the following components.

| | Pounds |
|---|---|
| Demineralized Water | 100 |
| Monawet MM-80 | 0.500 |
| Acrylamide | 1.0 |
| Styrene | 98.0 |
| Methacrylic Acid | 1.0 |
| Monawet MT-70 | 0.319 |
| Hydrosulfite AWC-Rice | 0.018 |
| t-Butyl Hydroperoxide | 0.012 |
| Nuosept 95 | 0.042 |
| Ammonium Persulfate | 0.273 |
| | 200.164 |

The foregoing were combined with glycoluril and polyol as in Example 1 to form clear coating formulation.

PAINT COMPOSITION

Example 3

| | Grams |
|---|---|
| Water | 100 |
| Ethoxylated nonylphenol surfactant | 4 |
| Octadecyl sulfosuccinamate surfactant | 9 |
| Silicon defoamer | 0.1 |
| Titanium dioxide | 100 |
| Silica | 100 |

The pigments were dispersed in water and surfactant mixture. Combine 150 g. of this dispersion with 300 g. of the clear coating formulation from Example 1. Then 12 g. p-toluenesulfonic acid was added and a film was cured at 200° F. for 1 minute.

EXAMPLES 4-12

The following Table I indicates test results on combinations of various emulsion polymers, polyols and glycoluril (TMGU). The polymer mixtures were heated to about 80° C. for one hour. About 1.5 grams of 40% p-toluenesulfonic acid per 40 grams sample of polymer solids mixture was added.

TABLE I

| Example | % Acrylamide in Latex | g Latex 50% NV | Polyol | Wt. Polyol | TMGU g(44%) | MEK Rubs | Gloss | Formulation Stabilty 25° C. |
|---|---|---|---|---|---|---|---|---|
| 4 | 4% | 50 g | Sorbitol | 12.5 g | 28 | 97 | 73 | >6 weeks |
| 5 | 4% | 50 g | Penta-erythritol | 12.5 | 28 | 100 | 72 | >6 weeks |
| 6 | 4 | 50 | trimethylol-propane | 12.5 | 28 | 63 | 71 | >6 weeks |
| 7 | 4 | 50 | neopentyl glycol | 12.5 | 28 | 37 | 74 | >6 weeks |
| 8 | 2 | 40 | Sorbitol | 15 | 33 | 65 | 77 | >12 weeks |
| 9 | 6 | 60 | Sorbitol | 10 | 22 | 100 | 47 | 2 weeks |
| 10 | 6 | 20 | Sorbitol | 20 | 44 | 68 | 82 | >12 weeks |
| 11 | 6 | 40 | Sorbitol | 20 | 22 | 91 | 78 | >12 weeks |

TABLE I-continued

| Example | % Acrylamide in Latex | g Latex 50% NV | Polyol | Wt. Polyol | TMGU g(44%) | MEK Rubs | Gloss | Formulation Stabilty 25° C. |
|---|---|---|---|---|---|---|---|---|
| 12 | 6 | 40 | Sorbitol | 10 | 44 | 95 | 80 | 4 weeks |

EXAMPLES 13–18

In contrast, polymeric mixtures without polyol were tested in Table II as follows.

TABLE II

| Example | % AAM in Latex | g Latex 50% NV | Polyol | 44% TMGU | MEK Rubs | Gloss | Stability |
|---|---|---|---|---|---|---|---|
| 13 | 0 | 100 | 0 | 114 | 30 | 65 | <2 weeks, 25° |
| 14 | 8 | 100 | 0 | 114 | 100 | 76 | <1 week, 25° |
| 15 | 8 | 100 | 0 | 114 | 67 | 69 | <1 week, 25° |
| 16 | 4 | 100 | 0 | 57 | 45 | 50 | <2 weeks, 25° |
| 17 | 8 | 100 | 0 | 57 | — | — | 45 minutes |
| 18 | 8 | 100 | 0 | 25 | — | — | 15 minutes |

The foregoing description and illustrative examples are not intended to be limiting except by the appended claims.

I claim:

1. A surface coating composition containing a polymeric binder, the binder comprising on a weight basis: between about 5% and 60% polyol containing two or more hydroxyl groups, between 2% and 60% glycoluril, and between 10% and 80% emulsion polymer, said emulsion polymer being emulsion copolymerized ethylenic monomers, said binder composition being heat curable and thermosetting to form a cured coating film.

2. The coating composition in claim 1 wherein the emulsion polymer contains reactive functional monomer selected from acrylamide, carboxyl, or hydroxyl containing monomer.

3. The coating composition in claim 1 wherein the emulsion polymer contains at least 10% by weight copolymerized functional monomers comprising 1% to 20% acrylamide or methacrylamide monomer, 0.5% to 10% carboxylic monomer, and 0% to 20% hydroxyalkyl monomer.

4. The composition in claim 3 wherein the acrylamide monomer is an N-alkanol amide.

5. The composition in claim 1 wherein the polyol contains three or more hydroxyl groups.

6. The composition in claim 1 as a polymer binder system for coating wood.

* * * * *